United States Patent
Hosono et al.

(10) Patent No.: US 7,595,955 B2
(45) Date of Patent: Sep. 29, 2009

(54) DISK DRIVE DEVICE AND METHOD FOR ERROR RECOVERY PROCEDURE THEREFOR

(75) Inventors: Mirei Hosono, Kanagawa (JP); Kazunari Tsuchimoto, Kanagawa (JP); Hideki Ohzeki, Kanagawa (JP); Tetsuo Ueda, Kanagawa (JP); Isao Yoneda, Kanagawa (JP); Kazuyuki Ishibashi, Kanagawa (JP); Hiroshi Uchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 40 days.

(21) Appl. No.: 12/069,311

(22) Filed: Feb. 7, 2008

(65) Prior Publication Data

US 2008/0186617 A1 Aug. 7, 2008

(30) Foreign Application Priority Data

Feb. 7, 2007 (JP) .............................. 2007-027914

(51) Int. Cl.
G11B 5/596 (2006.01)
G11B 20/20 (2006.01)
(52) U.S. Cl. .................... 360/77.08; 360/77.04; 360/76
(58) Field of Classification Search ........................ None
See application file for complete search history.

(56) References Cited

U.S. PATENT DOCUMENTS

| 6,097,565 | A | 8/2000 | Sri-Jayantha et al. |
| 6,510,017 | B1* | 1/2003 | Abdelnour ............... 360/77.04 |
| 6,671,119 | B2 | 12/2003 | Baumann et al. |
| 6,754,032 | B1 | 6/2004 | Szita et al. |
| 7,365,927 | B2* | 4/2008 | Takamatsu et al. ............ 360/48 |
| 2002/0109933 | A1 | 8/2002 | Ashikaga et al. |
| 2003/0112539 | A1* | 6/2003 | Shu .............................. 360/48 |

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments of the present invention help to achieve a read error recovery, and suppress decreases in the capacity of the disk drive device and degradation in performance. In one embodiment, a hard disk drive (HDD) performs following control without use of repeatable run-out (RRO) compensation information on a magnetic disk in a normal reading process. When an error occurs in a normal reading process, the HDD moves a read element to a position different from a target position of the normal reading process. At the position where the read element has been moved, the read element reads out the RRO compensation information. In a recovery procedure for the reading process where the error has occurred, the HDD performs following control with compensation by the servo compensation information read out by the read element.

19 Claims, 8 Drawing Sheets

Fig. 2(a)
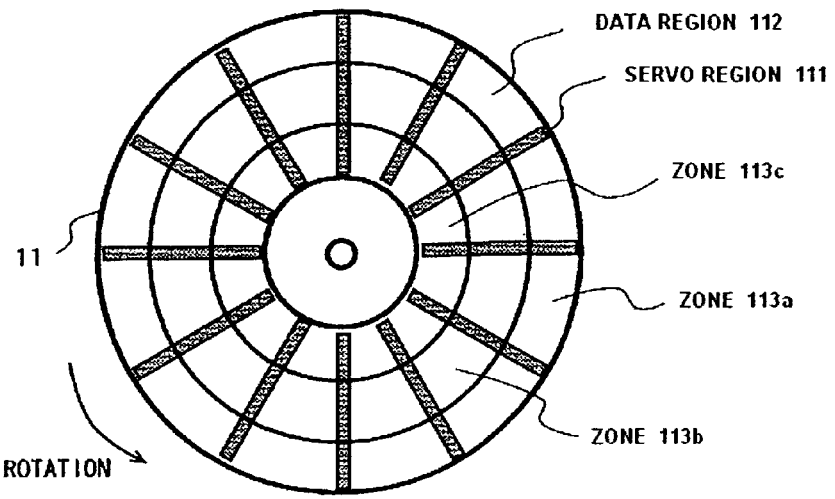
Fig. 2(b)
Fig. 2(c)
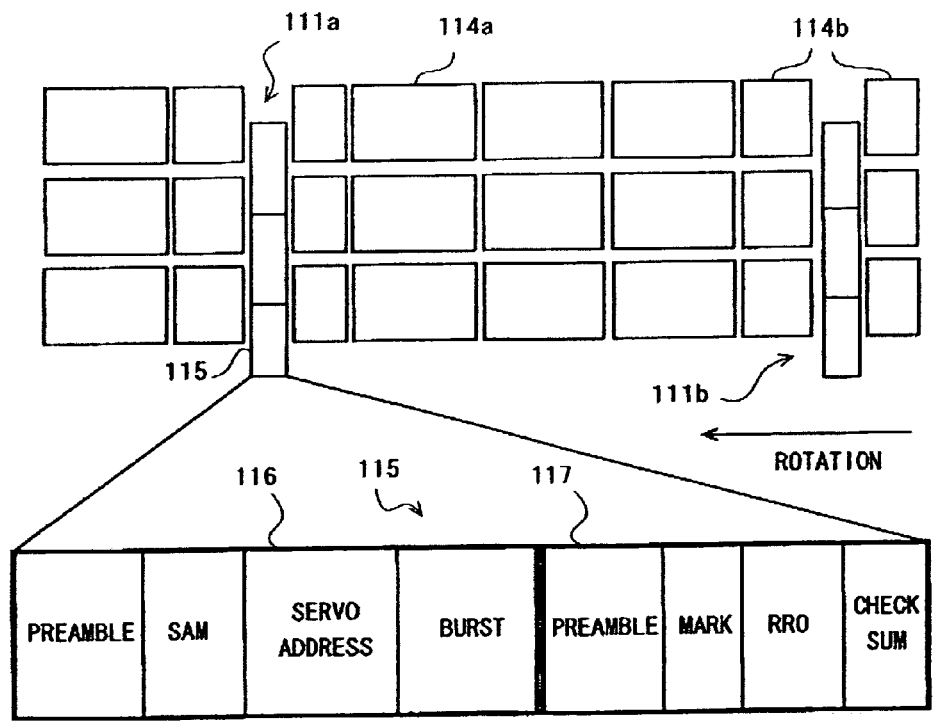

DISK DRIVE DEVICE AND METHOD FOR ERROR RECOVERY PROCEDURE THEREFOR

CROSS-REFERENCE TO RELATED APPLICATION

The instant nonprovisional patent application claims priority to Japanese Patent Application No. 2007-027914 filed Feb. 7, 2007 and which is incorporated by reference in its entirety herein for all purposes.

BACKGROUND OF THE INVENTION

Disk drive devices using various kinds of disks, such as an optical disk, a magneto-optical disk, and a flexible magnetic disk, have been known in the art. In particular, a hard disk drive (HDD) has been widely used as a storage device of a computer and has been, one of indispensable disk drive devices for current computer systems. Moreover, the HDD has found widespread application such as a removable memory used in a moving image recording/reproducing apparatus, a car navigation system, a cellular phone, or a digital camera, as well as the computer due to its outstanding characteristics.

Magnetic disks used in the HDD have a plurality of data tracks formed concentrically and a plurality of servo data sectors arranged discretely in the circumferential direction. User data is recorded in data sectors as units and the data sectors are recorded between respective servo sectors. A swinging actuator moves a head slider over a rotating magnetic disk. A head element portion of the head slider accesses a desired data sector according to positional information indicated by a servo sector so that writing and reading to and from data sector can be performed.

Servo sectors are preliminarily recorded on a magnetic disk in manufacturing an HDD. Typically, mechanical or electrical control of the head and the actuator of the HDD after mounting the magnetic disk on the HDD record the servo sectors on the magnetic disk. Due to an eccentricity of the magnetic disk or other factors such as external vibration, the recorded servo data may have deflections from an ideal annular track generated during writing the servo data or after recording the servo data. Hence, positional data which the head element portion reads out from a servo sector contain a component called repeatable run-out (RRO).

Although there is no problem if the RRO is small, if the RRO gets large, an accurate head positioning to a target position becomes difficult even though the head positioning is performed according to the read servo sector. However, there is a problem in memory capacity if data for compensating the RRO are stored in a memory with respect to all servo sectors.

Therefore, an approach has been proposed to reduce the RRO: data for compensating the RRO are preliminarily recorded in the magnetic disk (refer to Japanese Patent Publication No. 2003-53145 "Patent Document 1", for example). The head element portion reads out RRO compensating data in addition to usual positional data. The HDD controls the actuator so that the usual positional data read out by the head element portion gets close to the target position. On this occasion, it controls the actuator based on compensation by RRO compensation data read out by the head element portion. Typically, the RRO compensation data are recorded next to the positional data continuously in each servo sector.

The head element portion has a read element and a write element and there is an offset between the read element and the write element in the radial direction. This offset is called read/write offset. The read/write offset changes according to the radial position due to a skew. Therefore, there exists a discrepancy in the target radial position of the read element in between a writing process and a reading process. Therefore, in order to perform RRO compensation in both the reading and writing processes, it is required that RRO compensation data are recorded in each read element position. Recording the RRO compensation data onto the magnetic disk means a decrease of the region for recording user data.

One possible approach to this issue is a control that RRO compensation is performed in the writing process, and is not performed in the reading process. In the control, it is required only to record the RRO compensation data only for the writing process so that the decrease of the user data region is suppressed. However, in such control, head positioning in the reading process will be a problem.

Or, as disclosed in a Patent Document 1, RRO compensation in both reading and writing processes can be realized by recording RRO compensation data for a writing and a reading processes alternately in each servo sector discretely recorded in the circumferential direction. This means, however, that the RRO compensation in each process is performed with alternate servo sectors. Therefore, sufficient RRO compensation cannot be performed especially in the writing process so that problems such as off-track writing and squeezes between adjacent tracks may occur.

BRIEF SUMMARY OF THE INVENTION

Embodiments of the present invention help to achieve a read error recovery, and suppress decreases in the capacity of the disk drive device and degradation in performance. According to the particular embodiment of FIG. 7, a HDD performs following control without use of RRO compensation information on a magnetic disk in a normal reading process. When an error occurs in a normal reading process (S11, S12), the HDD moves a read element to a position different from a target position of the normal reading process (S13). At the position where the read element has been moved, the read element reads out the RRO compensation information (S14, S15). In a recovery procedure for the reading process where the error has occurred, it performs following control with compensation by the servo compensation information read out by the read element.

BRIEF DESCRIPTION OF THE DRAWINGS

FIGS. 2(a)-2(c) are views schematically illustrating the data format stored on the magnetic disk according to one embodiment.

DETAILED DESCRIPTION OF THE INVENTION

Figure 1:
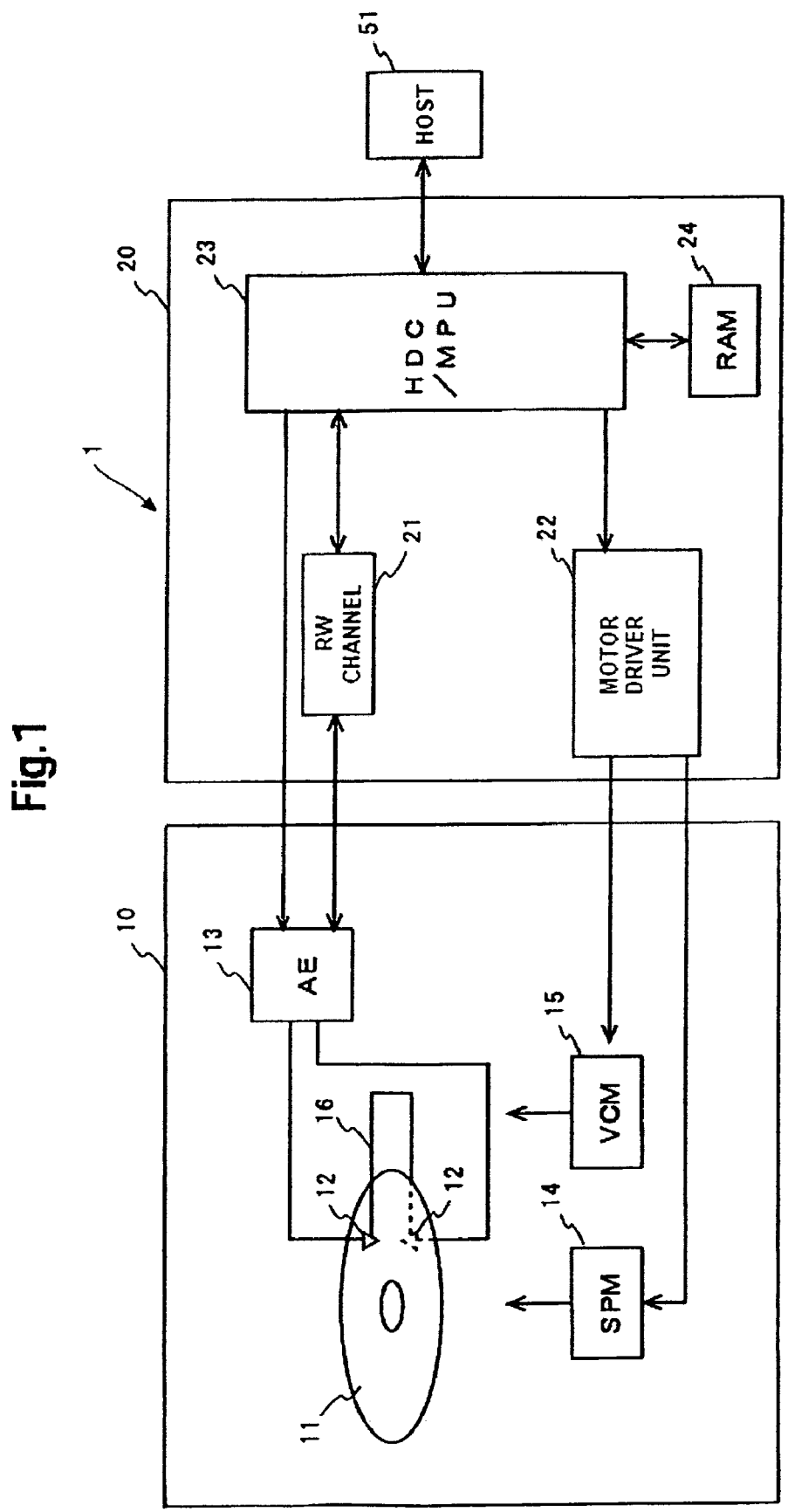
FIG. 1 is a block diagram schematically showing an entire configuration of the HDD according to the present embodiment.

Embodiments of the present invention relate to a disk drive device and a method for an error recovery procedure therefor, in particular, to servo control using servo compensation information recorded on a disk.

A disk drive device according to an aspect of embodiments of the present invention comprises a head having a read element and a write element, and a disk on which servo sectors are discretely recorded in a circumferential direction and servo compensation information corresponding to the servo sectors is recorded in a radial position on which the read element performs a following operation in a normal writing process, and a controller for performing following control with compensation by the servo compensation information in a normal writing process and for performing following control without using the servo compensation information on the disk in a normal reading process. If an error has occurred in the normal reading process, the controller moves the read element to a different position from a target position of the normal reading process. The moved read element reads out the servo compensation information at a position where the read element moved. The controller performs following control with compensation by the servo compensation information read out by the read element in a recovery procedure of the reading process in which the error has occurred. Not using servo information in the normal reading process but using the compensation information in the case that an error has occurred suppresses decrease in the capacity of the disk drive device and degradation in performance.

In the following control in the recovery procedure, the controller may use servo compensation information radially adjacent to a target position of the reading process where the error has occurred. The controller may use servo compensation information radially closest to the target position of the reading process in the following control in the recovery procedure. This achieves more preferable compensation.

The read element may read out servo compensation information corresponding to a servo sector immediately preceding to a target data sector of the reading process where the error has occurred, and the controller performs compensation by the servo compensation information in servo control using the immediately preceding servo sector in the following control in the recovery procedure. This achieves more accurate servo control.

The controller may change a compensation amount which is based on servo compensation information in accordance with a distance between a target position of the reading process where the error has occurred and the servo compensation information to be used in the following control in the recovery procedure. This achieves more preferable compensation.

The controller may decrease a compensation amount which is based on servo compensation information in accordance with increase of a distance between a target position of the reading process where the error has occurred and a target position of the servo compensation information to be used in the following control in the recovery procedure. This achieves more preferable compensation.

The controller may perform a read retry using the servo compensation information before performing a read retry with a changed target position in the recovery procedure of the reading process where the error has occurred. This achieves a prompt error recovery.

Another aspect of embodiments of the present invention is a method for a recovery procedure from a read error in a disk drive device comprising a head having a read element and a write element and a disk in which servo sectors are discretely recorded in a circumferential direction and servo compensation information corresponding to the servo sectors is recorded in a radial position on which the read element performs a following operation in a normal writing process. This method performs following control with compensation by the servo compensation information in a normal writing process, performs following control without using the servo compensation information on the disk in a normal reading process, moves the read element to a different position from a target position of the normal reading process if an error has occurred in the normal reading process, reads out the servo compensation information by the read element at a position where the read element moved, and performs following control with compensation by the servo compensation information read out by the read element in a recovery procedure of the reading process in which the error has occurred. Not using servo information in the normal reading process but using the compensation information in the case that an error has occurred suppresses decrease in the capacity of the disk drive device and degradation in performance.

A disk drive device according to yet another aspect of embodiments of the present invention comprises a head having a read element and a write element, a disk on which servo sectors are discretely recorded in a circumferential direction and servo compensation information corresponding to the servo sectors is recorded in a radial position on which the read element performs a following operation in a writing process, and a controller for executing a writing process in following control with compensation by servo compensation information for a writing process and a normal reading process to read data written in the writing process. If an error has occurred in the normal reading process, the controller moves the read element to a different position from a target position of the normal reading process. The moved read element reads out the servo compensation information for a writing process at a position where the read element moved. The controller performs following control with compensation by the servo compensation information for a writing process read out by the read element in a recovery procedure of the reading process in which the error has occurred. Using the servo compensation information for a writing process in the case that an error has occurred suppresses decrease in the capacity of the disk drive device and degradation in performance.

Embodiments of the present invention achieve error recovery by RRO compensation in a reading process while suppressing decrease of storage capacity and degradation in performance.

Hereinafter, particular embodiments of the present invention are described. For clearness of explanation, the following description and the accompanying drawings contain omissions and simplifications as appropriate. Throughout the drawings, the like components are denoted by like reference numerals, and their repetitive description is omitted if not necessary for the sake of clearness. Hereinbelow, particular embodiments of the present invention will be described by way of example of a hard disk drive (HDD) as an example of a disk drive device. A feature of the embodiments is a repeatable run-out (RRO) compensation in an error recovery procedure (ERP) in a reading process.

First, a configuration of an entire HDD will be outlined. FIG. 1 is a block diagram showing a schematic configuration of an entire HDD 1 according to the present embodiment. As shown in FIG. 1, the HDD 1 includes a magnetic disk 11 as an example of a disk for recording data, head sliders 12 for accessing the magnetic disk, an arm electronics (AE) 13, a spindle motor (SPM) 14, a voice coil motor (VCM) 15, and an actuator 16 in an enclosure 10. The HDD 1 further includes a circuit board 20 fixed outside the enclosure 10. On the circuit board 20, circuits such as a read/write channel (RW channel) 21, a motor driver unit 22, an integrated circuit (HDC/MPU) 23 of a hard disk controller (HDC) and an MPU, and a RAM 24.

The magnetic disk 11 is fixed to the SPM 14. The SPM 14 rotates the magnetic disk 11 at a predetermined angular rate. The motor driver unit 22 drives the SPM 14 in accordance with control data from the HDC/MPU 23. A head slider 12 includes a slider for flying over the magnetic disk, and a head element portion which is fixed to the slider and converts magnetic signals to and from electric signals. The head element portion, as an example of a head, has a read element for reading out data from the magnetic disk 11 and a write element for writing data to the magnetic disk 11.

The respective head sliders 12 are fixed to a tip end of the actuator 16. The actuator 16 is attached to the VCM 15 and pivots around a pivotal axis to move the head sliders 12 above the rotating magnetic disk 11 in its radial direction. The motor driver unit 22 drives the VCM 15 in accordance with control data (referred to as DACOUT) from the HDC/MPU 23.

The AE 13 selects a head slider 12 to access the magnetic disk 11 from a plurality of head sliders 12, amplifies a reproducing signal reproduced by the selected head slider 12, and sends it to the RW channel 21. Also, it sends a recording signal from the RW channel 21 to the selected head slider 12. The RW channel 21, in a reading process, amplifies a read signal supplied from the AE 13 to have a predetermined amplitude, extracts data from the obtained read signal, and decodes them. The decoded data are supplied to the HDC/MPU 23. The RW channel 21, in a writing process, code modulates write data supplied from the HDC/MPU 23, converts the code modulated data into a write signal, and supplies it to the AE 13.

In the HDC/MPU 23, the MPU works in accordance with firmware loaded onto the RAM 24. The HDC/MPU 23 carries out entire control of the HDD 1 as well as necessary processes concerning data processing such as reading/writing process control, command execution order management, positioning control of the head element portion using servo signals (servo control), interface control with the host 51, defect management, and an error recovery procedure when an error occurs. Especially, the HDC/MPU 23 according to the present embodiment performs servo control by RRO compensation in a writing process and in the error recovery procedure in a reading process.

FIGS. 2(a) to 2(c) schematically show recorded data on the magnetic disk 11. As shown in FIG. 2(a), a plurality of servo regions 111 which extend radially from the center of the magnetic disk 11 and are formed away at every predetermined angle and data regions 112 provided between two adjoining servo regions 111 are formed on the recording surface of the magnetic disk 11. The servo regions 111 and the data regions 112 are provided alternately at a predetermined angle. Servo data for positioning control of the head slider 12 are recorded in each servo region 111.

User data are recorded in each data region 112. The user data and the servo data are recorded on concentric data tracks and servo tracks, respectively. The data tracks are grouped into a plurality of zones in accordance with the radial position of the magnetic disk 11. The recording frequency is set to each zone. In FIG. 2(a), three zones 113a to 113c are exemplified. In FIG. 2(a), the magnetic disk 11 rotates counterclockwise.

FIG. 2(b) is a partial enlarged view of a recording surface of the magnetic disk 11 and FIG. 2(c) shows a data format of a servo sector 116. The direction from the right to the left in FIGS. 2(b) and 2(c) is the rotational direction of the magnetic disk 11. In FIG. 2(b), servo regions 111a and 111b are exemplified. A plurality of data sectors are recorded between two servo regions. There are two kinds of data sectors: a normal data sector 114a where all data are recorded between the servo regions 111, and a split sector 114b which is split by the servo region 111. A plurality of data sectors 114 aligned in the circumferential direction in the same radial positions constitute one data track.

The servo region 111 is constituted by a plurality of servo sectors 115 aligned in the radial direction. Also, a plurality of servo sectors 115 discretely aligned in the circumferential direction in the same radial positions constitute one servo track. A track center of the data track and a track center of the servo track may coincide with each other and may not coincide as shown in FIG. 2(b).

As shown in FIG. 2(c), the servo sector 115 according to the present embodiment contains RRO compensation data to perform RRO compensation in servo control in a writing process. Specifically, the servo sector 115 contains a positional field 116 which is normal servo data with positional data and an RRO compensation field 117 with data for the RRO compensation. The normal positional field 116 contains a preamble (PREAMBLE), a servo address mark (SAM), a servo address (SERVO ADDRESS), and a burst pattern (BURST) in order from the head.

The SAM indicates a beginning of actual information such as a servo address. The servo address typically contains a servo track ID consisted of gray codes and a sector ID. The burst pattern is a signal which indicates a more precise position of the servo track indicated by the track ID. The burst pattern typically contains four amplitude signals A, B, C, and D which are written staggered at slightly different positions in an orbit every servo track. The read element position (head position) can be specified by means of the servo address and the burst pattern read out by the read element.

An RRO compensation field 117 with data for the RRO compensation contains a preamble (PREAMBLE), a timing mark (MARK), RRO compensation data (RRO), and a check sum (CHECK SUM). The timing mark indicates a beginning of actual information such as subsequent RRO compensation data. The RRO compensation data indicates values for the compensation for the positional information of the positional field 116. Typically, each servo sector 115 has RRO compensation data corresponding to the normal servo data, and the RRO compensation data are recorded immediately next to the positional data (the servo address and the burst pattern) in the servo sector. However, the RRO compensation data may be positioned away from the servo sector containing positional data or the RRO compensation data corresponding to a servo sector (its positional data) may be contained in another servo sector.

Figure 3A:
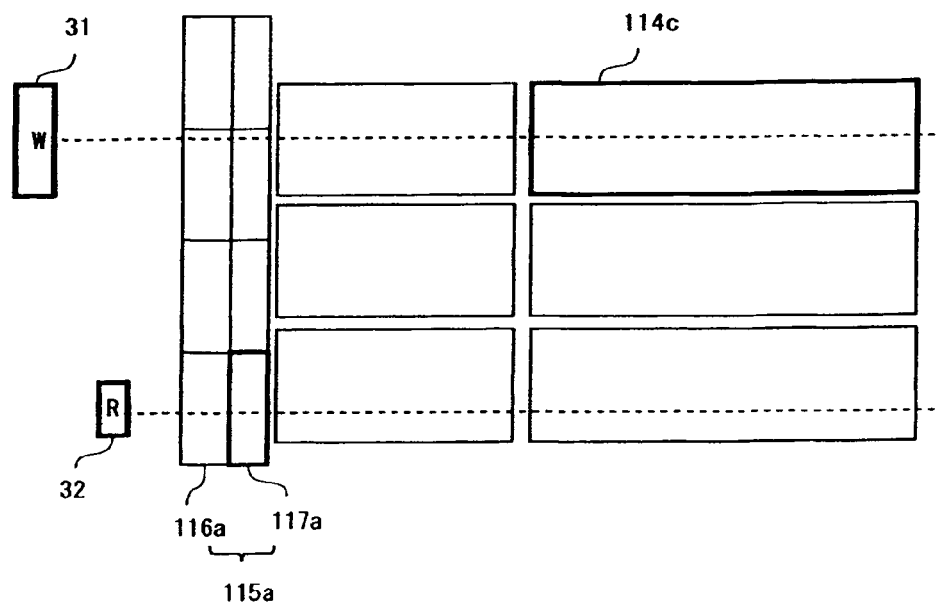
FIGS. 3(a) and 3(b) schematically illustrate the positions of the write element and the read element in the servo control in the normal reading process and the writing process according to one embodiment.

Next, servo control in normal reading and writing processes will be described referring to FIGS. 3(a) and 3(b). FIG. 3(a) schematically shows positions of the write element 31 and the read element 32 in the case that the write element 31 writes data into the data sector 114c. A read/write offset is present between the read element 32 and the write element 31 and the write element 31 is located at the outer peripheral side of the read element 32. The read element 32 reads out the positional field 116a and the RRO compensation field 117a of the servo sector 115a.

The HDC/MPU 23 performs head positioning control using the positional data (the servo address and the burst pattern) and the RRO compensation data read out by the read element 32. The HDC/MPU 23 controls the actuator 16 in accordance with the error between the target value and the positional data read out by the read element 32. On this occasion, it controls the position of the actuator 16 (head slider 12) after compensating the positional error or the VCM control data (DACOUT) in accordance with the error using a corresponding RRO compensation data value. In the writing process in this example, as shown in FIG. 3(a), the read element 32 is located nearly at the center of the servo sector 115 but the write element 31 is located at the position offset from the center of the servo sector 115.

Figure 3B:
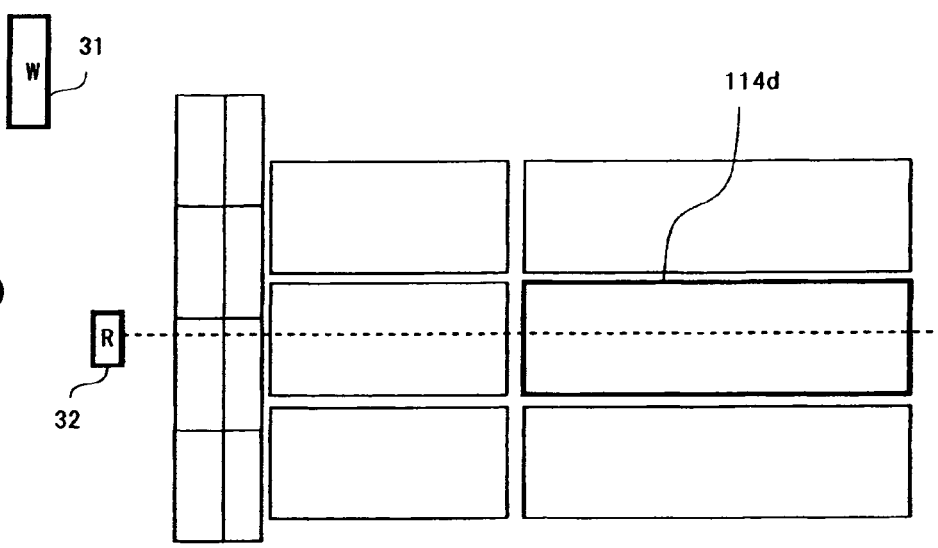

FIG. 3(b) schematically shows positions of the write element 31 and the read element 32 in the case that the read element 32 reads out data from the data sector 114d. In a normal reading process, the read element 32 performs a following operation so as to be at the center of the track of the data sector 114d to be read out. This control is executed using a radial offset amount calculated by such as a polynomial approximation based on the radial offset amounts at several sampling points measured in the manufacturing steps. The HDD 1 of the present embodiment does not perform the RRO compensation in the normal reading process. Accordingly, RRO compensation data for a reading process are not recorded in the radial position where the read element 32 is positioned. Hence, decrease in the storage area for user data due to the RRO data can be prevented.

The HDC/MPU 23 executes head positioning control based on the error between the positional information read out by the read element 32 and the target position. However, in the reading process, the positional information which the read element 32 reads out contains an RRO, too. Therefore, the HDC/MPU 23 may not be able to accurately position the head element portion to cause an error. When a read error occurs, the HDC/MPU 23 of the present embodiment reads out an RRO compensation field for a writing process close to the subject data sector in the radial direction and executes RRO compensation using the RRO compensation data in a read retry process. Thereby, recovery from the read error can be attempted.

Figure 4:
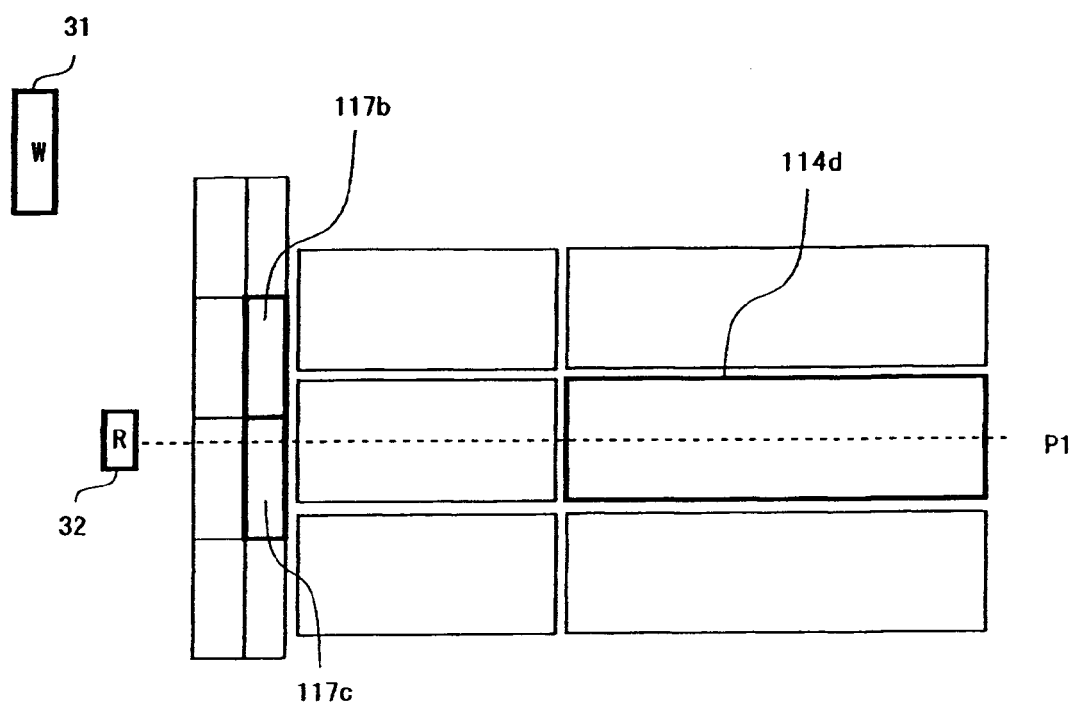
FIG. 4 illustrates the RRO compensation fields adjacent to the target data sector 114 in the read error recovery procedure according to one embodiment.

The RRO and its corresponding compensation value vary with radial positions. Therefore, the RRO data at a different radial position from the target sector do not always allow an accurate head positioning. However, performing the RRO compensation as an error recovery procedure enhances the possibility for error recovery. In the example of FIG. 4, RRO compensation fields 117b and 117c exist adjacent to the target data sector 114d. The HDC/MPU 23 executes the RRO compensation using RRO compensation data of either of the RRO compensation fields.

In a normal reading process, a target position P1 of the read element 32 is located between two RRO compensation data fields for a writing process 117b and 117c in the radial direction. Therefore, the read element 32 cannot accurately read out the RRO compensation data. In order to accurately read out these data, it is necessary for the read element 32 to move to the center of the respective servo tracks.

Figure 5A:
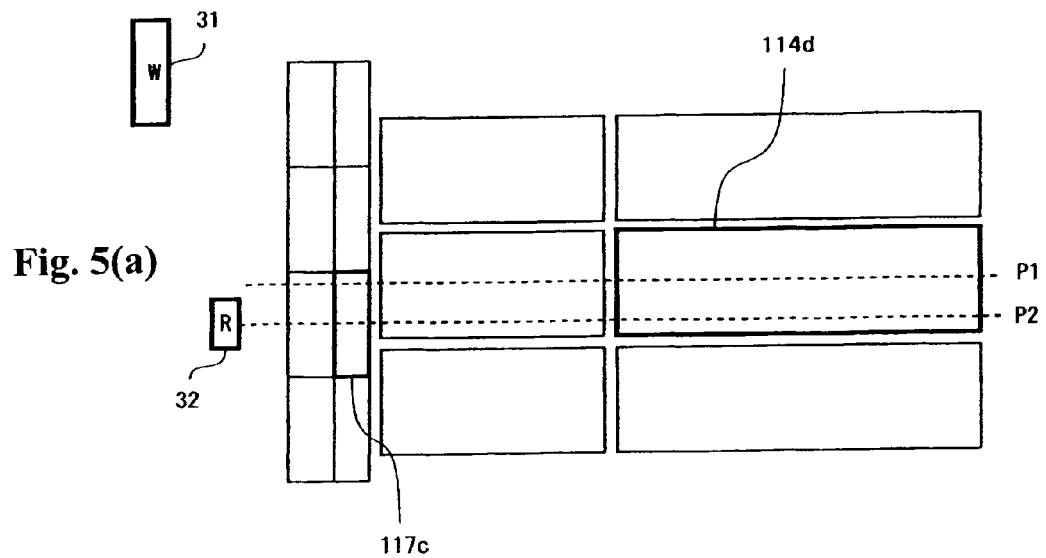
FIGS. 5(a) and 5(b) schematically illustrate the states that the read element reads out the adjacent RRO fields in the read error recovery procedure according to one embodiment.

FIG. 5(a) illustrates a case that the HDC/MPU 23 uses an adjacent RRO field 117c at the inner side. When an error occurs in reading a data sector 114d, the HDC/MPU 23 moves the position of the read element 32 to an inner side and positions the read element 32 at the center P2 of the servo track including the RRO field 117c. While the magnetic disk 11 rotates around once, the read element 32 reads out the RRO data of the respective servo sectors and the HDC/MPU 23 stores them in the RAM 24. Then, the HDC/MPU 23 positions the read element 32 at the center position of the data sector 114d to perform a read retry executing the RRO compensation using the obtained RRO data.

Figure 5B:
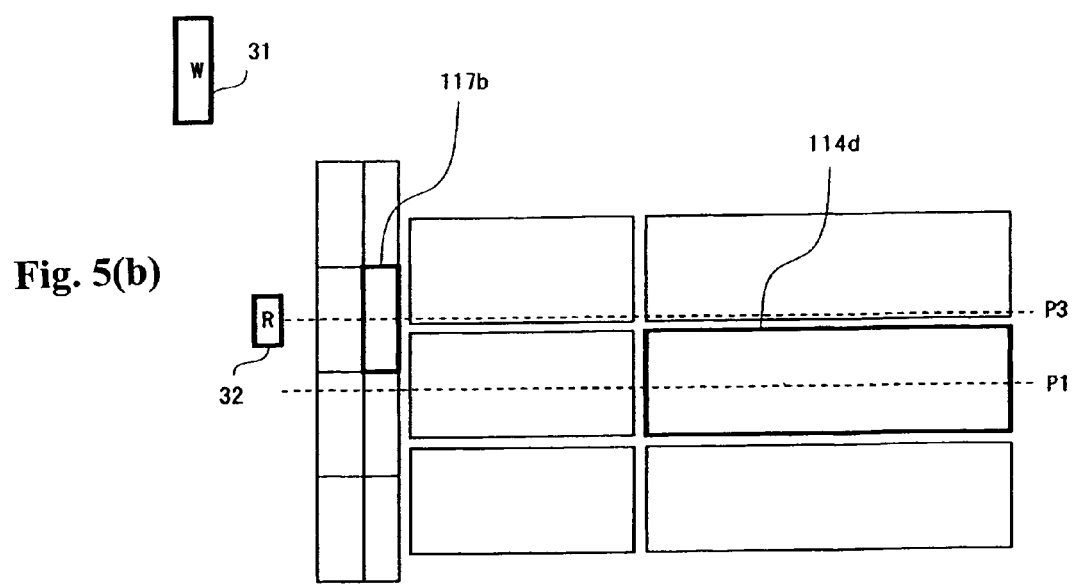

FIG. 5(b) illustrates a case that the HDC/MPU 23 uses an adjacent RRO field 117b at the outer peripheral side. The process within the HDD 1 is the same as the one in the FIG. 5(a) and the read element 32 is positioned at the center P3 of the servo track including the RRO field 117b. In this case, the servo track at the inner side is closer to the data sector 114d than the servo track at the outer peripheral side. Since the RRO varies with radial position, the RRO data to be used in an error handling procedure is preferably as close as possible to the data sector 114. In the above example, it is preferable to use the adjacent RRO at the inner side shown in FIG. 5(a).

Figure 6:
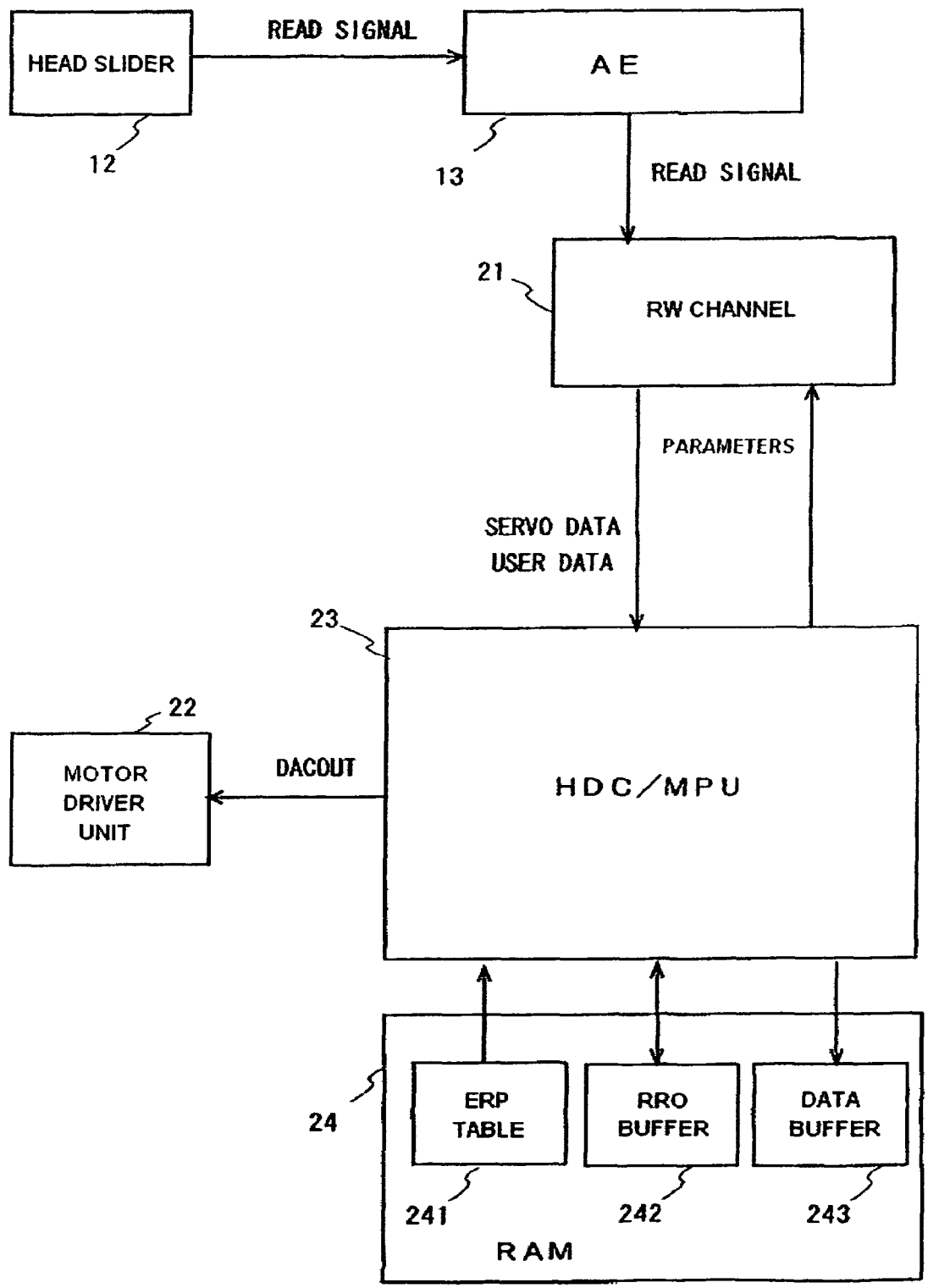
FIG. 6 is a block diagram schematically showing the configuration of the following operation with RRO compensation in the read error recovery procedure according to one embodiment.
Figure 7:
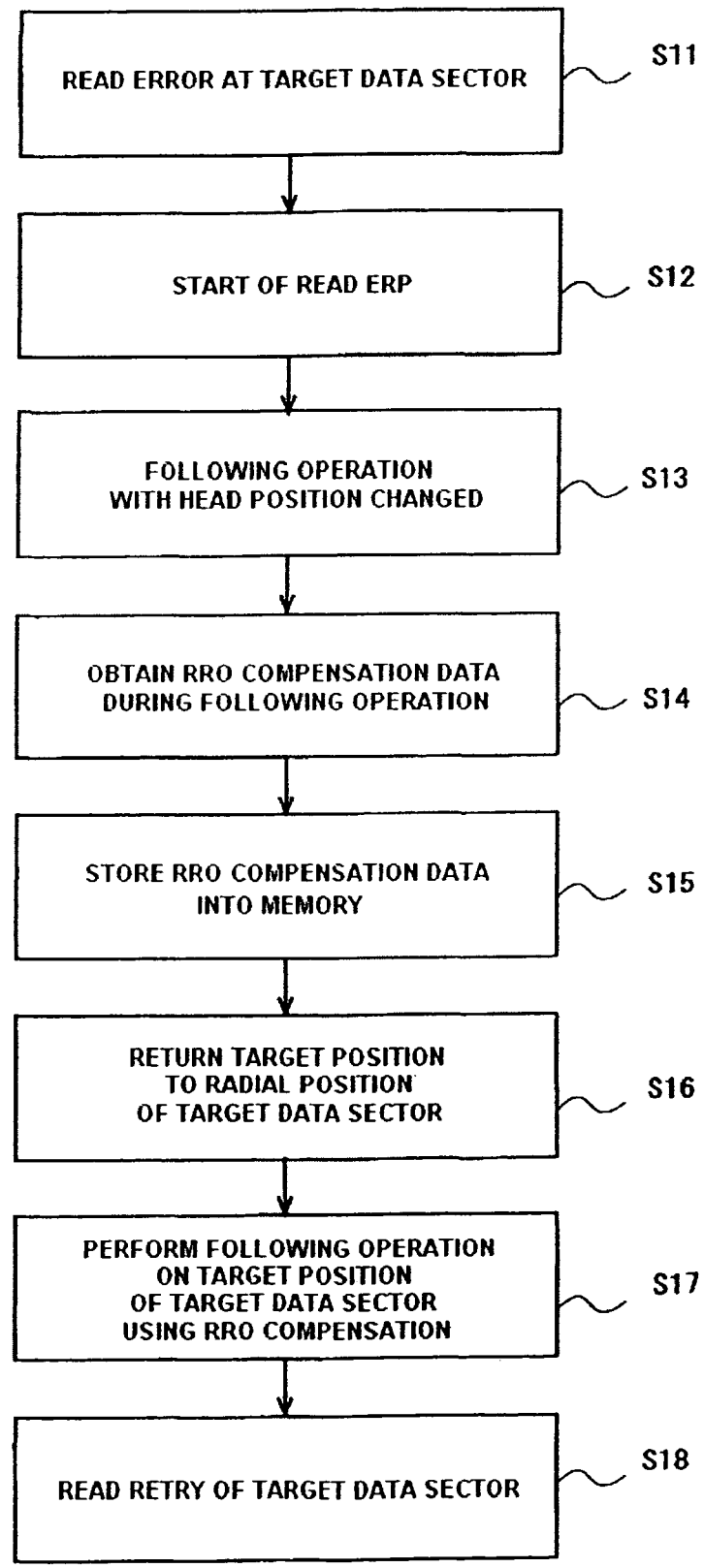
FIG. 7 is a flowchart of the following operation with RRO compensation in the read error recovery procedure according to one embodiment.

Subsequently, the error handling procedure shown in FIG. 5(a) will be described in detail referring to a block diagram of FIG. 6 and a flowchart of FIG. 7. When a read error occurs in the target sector 114d (S11), the HDC/MPU 23 starts a read ERP (S12). The HDC/MPU 23 executes the read ERP in accordance with an ERP table. The ERP table 241 is stored in the RAM 24. The ERP table 241 contains a plurality of recorded steps, for example 256 steps and the HDC/MPU 23 executes the respective ERP steps sequentially.

Typical ERP steps are changing a filter coefficient for waveform equalization in the RW channel 21, a track offset amount of the head element portion, and the like. The HDC/MPU 23 sets values (PARAMETERS) in a register in the RW channel 21 to adjust the filter coefficients, etc. The HDC/MPU 23 sends a control signal (DACOUT) indicating a VCM current value to the motor driver unit 22 to adjust the position of the actuator 16 or the head slider 12.

One of the ERP steps of the present embodiment is a read retry accompanied by the RRO compensation process. In this ERP step, the HDC/MPU 23 changes the target position of the read element 32 from a data sector 114d (P1 in FIG. 5) to a servo track position of the adjacent RRO field 117c (P2 of FIG. 5) and performs a following operation on the target position P2 (S13). The read signal (READ SIGNAL) of the servo sector which the head slider 12 read out is transferred to the RW channel 21 through the AE 13. The RW channel 21 performs a predetermined process to extract positional data and RRO compensation data (SERVO DATA) and send them to the HDC/MPU 23 (S14).

The HDC/MPU 23 sends control data (DACOUT) to specify a VCM current value to the motor driver unit in accordance with the obtained positional data to perform the servo control of the actuator 16. Moreover, the HDC/MPU 23 stores the obtained RRO compensation data of the respective servo sectors in an RRO buffer 242 in the RAM 24 (S15). The HDC/MPU 23 obtains RRO fields to the RRO field 117c of the servo sector immediately preceding the target data sector 114d. At this timing, the magnetic disk 11 has rotated once since the occurrence of the error in the target data sector 114d.

After the read element 32 has read out the RRO field 117c immediately preceding the data sector 114d, the HDC/MPU 23 positions the read element 32 to the target position P1 corresponding to the data sector 114d (S16). The HDC/MPU 23 performs a following operation on the target position P1 performing RRO compensation using the positional data read out by the read element 32 and the RRO compensation data stored in the RRO buffer 242 (S117).

If the magnetic disk 11 rotates in the following operation on the P1, the read element 32 reaches a target data sector 114*d*. The HDC/MPU 23 retries reading the sector (S18). The read signal (READ SIGNAL) of the data sector read out by the read element 32 is transferred to the RW channel 21 via the AE 13. The RW channel 21 performs a predetermined process to extract user data (USER DATA) and send them to the HDC/MPU 23. The HDC/MPU 23 performs such as an ECC process for the obtained user data and stores them in a data buffer 243 in the RAM 24. This is the end of the ERP steps with RRO compensation.

As described above, reading out RRO compensation data for a writing process and carrying out an error recovery step which performs following operation with RRO compensation in the ERP achieves recovery from a read error with suppressing decrease in storage capacity. Besides, since process time for reading out the RRO compensation data is not necessary in a normal reading process, significant performance degradation can be prevented.

On this occasion, the ERP steps using the RRO compensation may concurrently change parameters of the RW channel 21. If the RRO compensation data can be concurrently read out in the ERP steps for changing the target position, those processes may be carried out concurrently and in parallel.

On this occasion, if the HDC/MPU 23 cannot perform an accurate servo control, a possibility for error recovery by changing the target position or changing parameters for the RW channel 21 is small. Therefore, an ERP step using the RRO compensation is preferably recorded as a high order step in the ERP table 241 as possible. Specifically, it is recommended that it should be performed in the first ERP step or before the first head offset step.

In the above explanation, the HDC/MPU 23 uses the compensation amount indicated by the RRO compensation data without change. However, since the RRO varies with radial position, it is not always preferable to use the RRO compensation data as they are at a different radial position from the target data sector. Rather, there is a possibility to deteriorate the stability in the servo control. Then, it is preferable that a servo control is performed with a smaller value of the compensation amount than the compensation value indicated by the obtained RRO compensation data.

In a preferred example, the RRO compensation value is changed in accordance with the overlapping rate of the RRO compensation data to be used and the target data sector. For instance, in the example of FIG. 5(*a*), the HDC/MPU 23 changes the compensation amount in accordance with the distance between the target position P1 of the data sector 114*d* and the target position P2 of the RRO field 117*c*.

Specifically, the value obtained by multiplying the compensation amount indicated by the RRO field by gain K is assumed to be the actual compensation amount. The gain K is defined to be decreased with increasing distance (decreasing overlapping rate). For example, assuming that the error between the target of the data sector and the positional data read out by the read element is Raw PES and that the compensation value indicated by the RRO compensation data is RRO VALUE, the positional error PES from the target to be used in a head positioning can be defined by the following equation:

$$PES = \text{Raw } PES - K \times RRO \text{ VALUE}$$

The HDC/MPU 23 determines a current value to be supplied to the VCM 15 using the PES obtained by the above equation.

Figure 8A:
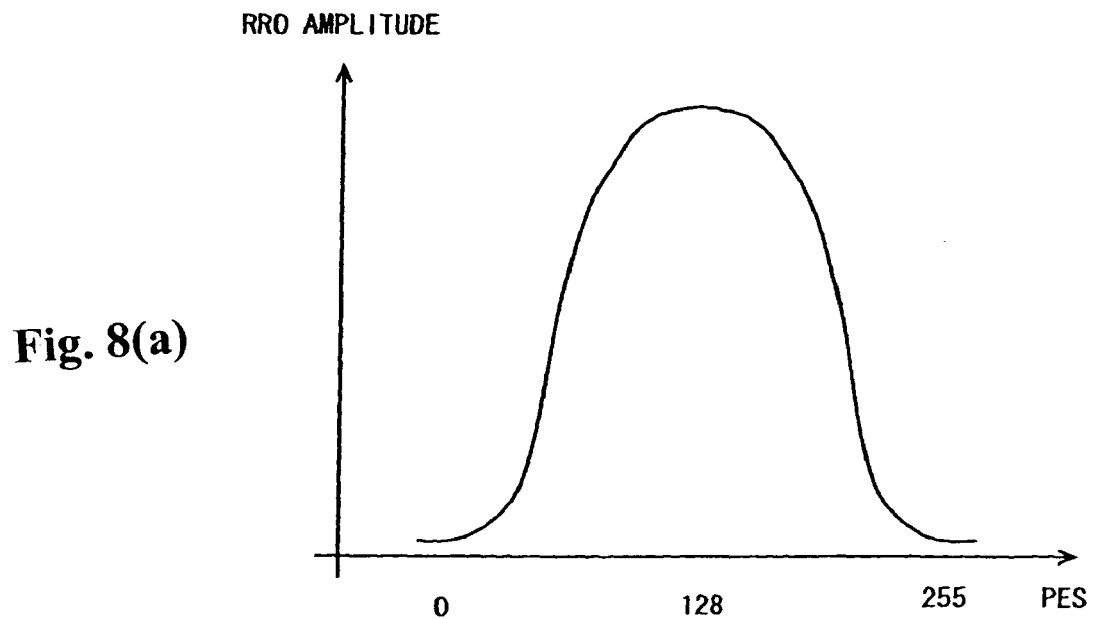
FIGS. 8(a) and 8(b) are diagrams schematically showing appearances to change the compensation amount indicated by the RRO compensation data in accordance with the distance between the RRO compensation field and the target data sector.
Figure 8B:
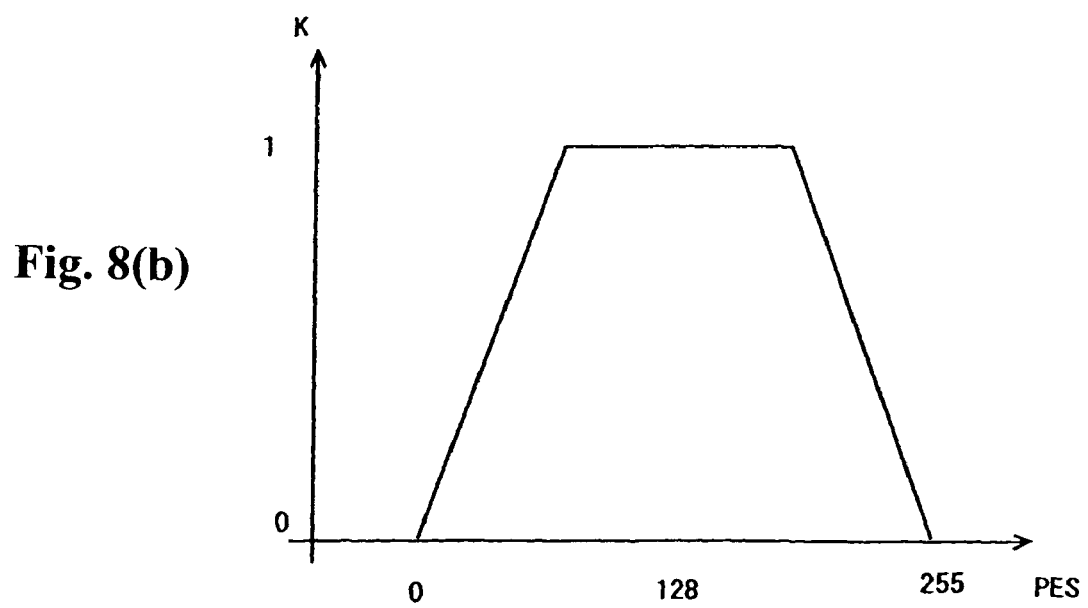

FIG. 8(*a*) schematically shows the relationship between the distance from the center of the RRO field and the signal amplitude value (amplitude value of a preamble) of the RRO field. PES corresponds to the distance from the center of the RRO field and the 128 corresponds to the center. The PES 0 and 255 correspond to the centers of adjacent RRO fields (servo tracks). The PES itself can be defined using the burst pattern of the servo track. The signal amplitude value of the RRO field significantly decreases with increasing distance from a specific position from the center.

As described above, as the RRO field to be used in the RRO compensation departs from the target data track, the possibility increases that the RRO compensation value is different from the proper RRO compensation value. Then, the gain K of the RRO compensation value is defined in accordance with the distance (positional error) from the center of the used RRO field to the center of the target sector as shown in FIG. 8(*b*), for example. The PES 128 means that the center of the RRO field coincides with the center position of the target data sector. Assume that the gain K is 1 from the positional error 0 to a specific set value and it decreases with the increasing positional error as a linear function. At the PES 0 and 255, the gain K is 0.

The HDC/MPU 23, as described above, determines the gain K from the error between the respective target positions of the target data sector 114*d* and the RRO field 117*c* which the HDC/MPU 23 has preliminarily obtained. The HDC/MPU 23 thereby can calculate an appropriate gain K easily. The ERP table 241 preferably has both of a step for compensating the RRO compensation value by the gain K and a step for not compensating the same. However, only the step for compensating may be recorded in the ERP table 241.

The way of calculating the gain K is not limited to the above example but the gain K may follow another definition of changing in accordance with the distance between the target sector and the RRO field to be used. For example, the gain K may be defined by a curve decreasing quadratically or by stepwise changes in accordance with increase of positional errors. Also, it is not eliminated from the scope of embodiments of the present invention that the gain K is determined using actual measurements instead of the preregistered target position or using a function that partially increases in accordance with the distance of the RRO field based on the designs.

As set forth above, the present invention is described by way of particular embodiments but is not limited to the above embodiments. A person skilled in the art can easily modify, add, and convert the each element in the above embodiments within the scope of the present invention. For example, the RRO compensation in the read ERP is preferably performed at the servo sector immediately preceding the target data sector and a plurality of servo sectors preceding thereto. However, the compensation may be performed only at the immediately preceding servo sector or at servo sectors except for the immediately preceding servo sector. In the ERP to perform the RRO compensation, the RRO compensation during a following operation may be performed not on the respective servo sectors but on every other servo sectors. The servo control of embodiments of the present invention is applicable to disk drive devices other than the HDD.

What is claimed is:

1. A disk drive device comprising:
    a head having a read element and a write element;
    a disk on which servo sectors are discretely recorded in a circumferential direction and servo compensation information corresponding to the servo sectors is recorded in a radial position on which the read element performs a following operation in a normal writing process; and a controller for performing following control with compensation by the servo compensation information in a normal writing process and for performing following control without using the servo compensation information on the disk in a normal reading process; wherein the controller moves the read element to a different position from a target position of the normal reading process if an error has occurred in the normal reading process;

the moved read element reads out the servo compensation information at a position where the read element moved; and the controller performs following control with compensation by the servo compensation information read out by the read element in a recovery procedure of the reading process in which the error has occurred.

2. The disk drive device according to claim 1, wherein
in the following control in the recovery procedure, the controller uses servo compensation information radially adjacent to a target position of the reading process where the error has occurred.

3. The disk drive device according to claim 2, wherein
the controller uses servo compensation information radially closest to the target position of the reading process in the following control in the recovery procedure.

4. The disk drive device according to claim 1, wherein
the read element reads out servo compensation information corresponding to a servo sector immediately preceding to a target data sector of the reading process where the error has occurred; and the controller performs compensation by the servo compensation information in servo control using the immediately preceding servo sector in the following control in the recovery procedure.

5. The disk drive device according to claim 1, wherein
the controller changes a compensation amount which is based on servo compensation information in accordance with a distance between a target position of the reading process where the error has occurred and the servo compensation information to be used in the following control in the recovery procedure.

6. The disk drive device according to claim 5, wherein
the controller decreases a compensation amount which is based on servo compensation information in accordance with increase of a distance between a target position of the reading process where the error has occurred and a target position of the servo compensation information to be used in the following control in the recovery procedure.

7. The disk drive device according to claim 1, wherein
the controller performs a read retry using the servo compensation information before performing a read retry with a changed target position in the recovery procedure of the reading process where the error has occurred.

8. A method for a recovery procedure from a read error in a disk drive device comprising a head having a read element and a write element and a disk in which servo sectors are discretely recorded in a circumferential direction and servo compensation information corresponding to the servo sectors is recorded in a radial position on which the read element performs a following operation in a normal writing process, the method comprising:

performing following control with compensation by the servo compensation information in a normal writing process;

performing following control without using the servo compensation information on the disk in a normal reading process;

moving the read element to a different position from a target position of the normal reading process if an error has occurred in the normal reading process;

reading out the servo compensation information by the read element at a position where the read element moved; and performing following control with compensation by the servo compensation information read out by the read element in a recovery procedure of the reading process in which the error has occurred.

9. A method according to claim 8, wherein
in the following control in the recovery procedure, servo compensation information radially adjacent to a target position of the reading process where the error has occurred, is used.

10. A method according to claim 9, wherein
servo compensation information radially closest to the target position of the reading process is used in the following control in the recovery procedure.

11. A method according to claim 8, wherein
a compensation amount indicated by servo compensation information is changed in accordance with a distance between a target position of the reading process where the error has occurred and the servo compensation information to be used in the following control in the recovery procedure.

12. A method according to claim 11, wherein
a compensation amount indicated by servo compensation information decreases in accordance with increase of a distance between a target position of the reading process where the error has occurred and a target position of the servo compensation information to be used in the following control in the recovery procedure.

13. A disk drive device comprising:
a head having a read element and a write element;
a disk on which servo sectors are discretely recorded in a circumferential direction and servo compensation information corresponding to the servo sectors is recorded in a radial position on which the read element performs a following operation in a writing process; and a controller for executing a writing process in following control with compensation by servo compensation information for a writing process and a normal reading process to read data written in the writing process; wherein the controller moves the read element to a different position from a target position of the normal reading process if an error has occurred in the normal reading process;

the moved read element reads out the servo compensation information for a writing process at a position where the read element moved; and the controller performs following control with compensation by the servo compensation information for a writing process read out by the read element in a recovery procedure of the reading process in which the error has occurred.

14. The disk drive device according to claim 13, wherein
in the following control in the recovery procedure, the controller uses servo compensation information for a writing process radially adjacent to a target position of the reading process where the error has occurred.

15. The disk drive device according to claim 14, wherein the controller uses servo compensation information for a writing process radially closest to the target position of the reading process in the following control in the recovery procedure.

16. The disk drive device according to claim 13, wherein
the read element reads out servo compensation information for a writing process corresponding to a servo sector immediately preceding to a target data sector of the reading process where the error has occurred; and
the controller performs compensation by the servo compensation information in servo control using the immediately preceding servo sector for a writing process in the following control in the recovery procedure.

17. The disk drive device according to claim 13, wherein the controller changes a compensation amount which is based on servo compensation information for a writing process in accordance with a distance between a target position of the reading process where the error has occurred and the servo compensation information to be used in the following control in the recovery procedure.

18. The disk drive device according to claim 17, wherein the controller decreases a compensation amount which is based on servo compensation information for a writing process in accordance with increase of a distance between a target position of the reading process where the error has occurred and a target position of the servo compensation information to be used in the following control in the recovery procedure.

19. The disk drive device according to claim 13, wherein the controller performs a read retry using the servo compensation information before performing a read retry with a changed target position in the recovery procedure of the reading process where the error has occurred.

\* \* \* \* \*